United States Patent [19]

Irie

[11] Patent Number: 5,225,138
[45] Date of Patent: Jul. 6, 1993

[54] METHOD AND APPARATUS FOR GRIPPING, INFLATING AND COOLING VULCANIZED TIRES

[75] Inventor: Nobuhiko Irie, Nagasaki, Japan

[73] Assignee: Mitsubishi Jukogyo Kabushiki Kaisha, Tokyo, Japan

[21] Appl. No.: 769,638

[22] Filed: Oct. 1, 1991

[30] Foreign Application Priority Data

Oct. 2, 1990 [JP] Japan .................. 2-263160
Oct. 2, 1990 [JP] Japan .................. 2-263161

[51] Int. Cl.⁵ .................. B29C 71/02; B29C 35/16
[52] U.S. Cl. .................. 264/502; 264/572;
264/237; 264/326; 414/225; 425/38; 425/44;
425/58.1; 425/186; 425/446
[58] Field of Search ............... 264/501, 502, 315, 326,
264/572, 237; 425/38, 58.1, 42, 44, 446, 186;
414/225

[56] References Cited

U.S. PATENT DOCUMENTS

| | | |
|---|---|---|
| 3,075,237 | 1/1963 | Soderquist . |
| 3,214,791 | 11/1965 | Ericson et al. .................. 425/58.1 |
| 3,483,596 | 12/1969 | Ulm .................. 425/38 |
| 3,605,182 | 9/1971 | Ulm .................. 425/58.1 |
| 3,621,520 | 11/1971 | Ulm .................. 425/58.1 |
| 4,092,090 | 5/1978 | Yuhas .................. 425/58.1 |
| 4,169,698 | 10/1979 | Turk et al. .................. 425/38 |
| 4,702,669 | 10/1987 | Ichikawa et al. .................. 425/38 |

*Primary Examiner*—Jeffery Thurlow
*Assistant Examiner*—Mathieu Vargot
*Attorney, Agent, or Firm*—Wenderoth, Lind & Ponack

[57] ABSTRACT

A PCI main body includes two sets of gripping mechanisms and is rotatable about a horizontal axis, and a loader for detachably gripping an outside rim of the PCI and which is swingable in a horizontal plane. A vulcanized tire is received on the outside rim of the loader externally of the PCI main body, the loader is rotated to a position underneath the PCI main body, the tire and the outside rim are locked to the main body, a tire is seated on and fixed between an inside rim and the outside rim, compressed fluid is fed to the inside of the tire, and the PCI main body is rotated. Accordingly, a degree of precision in the concentricity between the respective rims can be maintained, a remote operation is possible, and the rims can be exchanged in a short period of time. Also, in addition to the above-mentioned features, a slide mechanism causes a support member for the outside rim to retreat upon rotation of the loader. Thus, the stroke of a rim interval adjusting screw can be relatively short.

16 Claims, 6 Drawing Sheets

METHOD AND APPARATUS FOR GRIPPING, INFLATING AND COOLING VULCANIZED TIRES

BACKGROUND OF THE INVENTION

1. Field of the Invention

The present invention relates to an apparatus for gripping, inflating and cooling vulcanized tires (hereinafter called PCI) and a method for gripping, inflating and cooling vulcanized tires.

2. Description of the Prior Art

In the case of tires in which nylon cords are used as reinforcement members, the PCI is used for the purpose of feeding compressed fluid into uncooled vulcanized tires carried out from a vulcanizing machine and cooling the same tires under an inflated condition. In the PCI in the prior art, an inside rim (a rim closer to the center of rotation of the PCI main body) is fixed to the PCI main body, while an outside rim is fixed via a rim interval adjust screw mechanism or a spacer to a frame that can be moved by means of a hydraulic cylinder in a direction at right angles to a center line of rotation of the PCI main body. Reaction forces of inflation of the same tire are taken up by a bayonet lock mechanism. A method of carrying an uncooled tire, delivered from the vulcanizing machine, onto one of the rims is employed in the prior art. This method is executed by a conveyor, by means of an unloader associated with the vulcanizing machine, or by a loader associated with the PCI after the delivered uncooled tire has released the bayonet lock mechanism and the space between the respective rims has been maintained.

However, the above-described method in the prior art involves the following problems.

The preciseness of the concentricity of the respective rims largely influences the uniformity of a produced tire. However, because of space restrictions, a high precision type guide such as a linear bearing or the like cannot be used as a guide for facilitating the sliding of an outside rim mount frame. Hence, the precision in concentricity of the respective rims is limited, and tire uniformity cannot be optimized.

Moreover, if the operation is stopped for a long period of time or if there is an interruption period, lamp black from the uncooled rim would cause main screw threads to seize. Hence rim interval adjustment would frequently become impossible. Even in the spacer method employed as a counter-measure against such problems, it is inconveniently necessary to provide and store a large variety of spacers.

In addition, the replacement of rims and adjustment of the rim spacing are operations which must be carried out in the PCI at locations where there is poor footing. Also, each rim has a weight of several kilograms even in the case of a rim for use with a passenger car tire. Therefore, carrying out the above operations is dangerous work. Still further, if a seizing of the screws occurs, the screw portion must be removed from the machine, thereby creating down time of the machine.

SUMMARY OF THE INVENTION

It is therefore one object of the present invention to provide an improved method and an improved apparatus for gripping, inflating and cooling vulcanized tires, which improves uniformity of a produced tire, which can prevent problems caused by lamp black from an uncooled vulcanized tire adhering to an adjust screw portion of the PCI, which insures safety of various operations necessary during use of the PCI, and which requires a comparatively small space for carrying out the operations necessary during use of the PCI.

To achieve this object, in an apparatus for gripping, inflating and cooling vulcanized tires including a main body supporting two pairs of inner and outer rims and rotatable about a horizontal axis, and a loader capable of gripping an outside rim and swingable in a horizontal plane, a post-cure inflation method of the present invention comprises: seating a tire fed from an unloader associated with a vulcanizing machine on the outside rim gripped by the loader externally of the main body, swinging the loader underneath the main body of the gripping, inflating and cooling apparatus, locking the outside rim and the tire to the main body, feeding compressed air into the tire after the tire has been seated on the inside rim, and rotating the main body of the gripping, inflating and cooling apparatus.

This object is also achieved according to the present invention by providing an apparatus for gripping, inflating and cooling vulcanized tires, which comprises: a main body frame rotatable about a horizontal axis, two beams disposed symmetrically on opposite sides of the main body frame and integral with the main body frame, two inside rims mounted on opposite sides of the main body frame and movable in radial directions thereof, i.e. perpendicular to the horizontal axis, two outside rims detachably mounted to the two beams and each cooperating with an inside rim to grip a tire therebetween, a fluid mechanism for feeding and exhausting compressed fluid into and from the inside of the tire through the inside rim, and a loader arm having gripping fingers for gripping the above-mentioned outside rim at its tip end, the loader arm being swingable in a horizontal plane and vertically movable between a position right under the main body of the vulcanized tire gripping, inflating and cooling apparatus and tire receiving and ejecting positions outside of the same main body spaced from a vertical plane passing through a rotational axis of the main body such that mounting and dismounting of the tire may be carried out at a position under the main body of the gripping, inflating and cooling apparatus.

To still further achieve this object, in an apparatus for gripping, inflating and cooling vulcanized tires including a main body supporting two pairs of inner and outer rims and rotatable about a horizontal axis, a loader capable of gripping an outside rim and swingable in a horizontal plane, and a slide mechanism for sliding a support member secured to the main body upon rotation of the above-mentioned loader, a post-cure inflation method of the present invention comprises: seating a tire fed from an unloader associated with a vulcanizing machine on the outside rim gripped by the loader externally of the main body, swinging the loader underneath the main body of the gripping, inflating and cooling apparatus, sliding the support member to a position which will center the support member relative to the gripped outside rim, locking the outside rim and the tire to the support member, feeding compressed air into the tire after the tire has been seated on the inside rim, and rotating the main body of the gripping, inflating and cooling apparatus.

This object is also achieved according to the present invention by providing an apparatus for gripping, inflating and cooling vulcanized tires, which comprises: a main body frame rotatable about a horizontal axis, two beams disposed symmetrically on opposite sides of the main body frame and integral with the main body frame, two inside rims mounted on opposite sides of the main body frame and movable in radial directions, i.e. perpendicular to the horizontal axis, two outside rims detachably mounted to the two beams and each cooperating with an inside rim to grip a tire therebetween, a fluid mechanism for feeding and exhausting compressed fluid into and from the inside of the tire through the inside rim, a loader arm having gripping fingers for gripping the above-mentioned outside rim at its tip, the loader arm being swingable in a horizontal plane and vertically movable between a position right under the main body of the vulcanized tire gripping, inflating and cooling apparatus and tire receiving and ejecting positions outside of the same main body, and slide blocks capable of supporting the outer rims and movable along the above-described beams, such that the mounting and dismounting of the tire may be carried out at a position under the main body of the gripping, inflating and cooling apparatus.

According to a first aspect of the present invention, the present invention is characterized by the following improvements over the method and apparatus in the prior art as described previously:

(1') An outside rim mount frame is integrated with a PCI main body; a loader forms part of the PCI; a rim is detachable from the PCI main body frame; while a tire is held in place on that rim, the rim and the tire are jointly carried in and out of the PCI main body by means of the loader; and reception of an uncooled tire and delivery of a cooled tire are effected outside of the PCI main body.

(2) A rim interval adjusting screw is provided within the PCI main body frame.

(3) A rim pressing mechanism (a seal cylinder in the illustrated embodiment) is provided in associated with the outside rim.

In addition, according to a second aspect of the invention, the present invention is characterized by the following improvements over the method and apparatus in the prior art as described previously.

(1) An outside rim mount frame is integrated with a PCI main body; a rim holder to which a rim is mounted is detachable from the frame; and a loader is provided for carrying the tire jointly with the rim holder associated with the same rim in and out of the PCI main body.

(2') For the purpose of insuring gas-tightness between the tire bead portions and the rims at the time of injecting compressed gas into the tire, the above-described loader functions to press the rims against the tire.

(3') A slide block, which can be inserted between the rim holder and the main body frame, is provided.

(4') A rim interval adjusting screw is provided within the main body frame.

(5') A vulcanized tire suspended from an unloader associated with a vulcanizing machine may be directly delivered onto the outside rim carried out by the loader of the PCI.

The following advantages can be attributed to the above-described first aspect of the present invention:

(1) Because an uncooled tire is received outside of the PCI main body, the seizure of a threaded portion of the PCI main body caused by lamp black can be prevented. In addition, the space necessary for allowing the PCI main body to rotate is relatively small, and the precision in concentricity of the respective rims is high.

(2) Because the rim interval adjusting screw is located within the PCI main body frame, it is difficult for lamp black to penetrate and adhere thereto.

(3) The stroke of the rim interval adjusting screw is rather small and hence, the space necessary for allowing rotation of the PCI main body can be achieved.

The following advantages can be attributed to the above-described second aspect of the present invention:

(1') Because a tire together with a rim holder associated with a rim is carried in and out of a PCI main body with the loader, there is a high degree of precision in the concentricity of the respective rims when the tire is gripped and inflated. Also, space necessary for rotation of the PCI main body is minimal.

(2') Because the loader can press the rims against a tire in order to insure gas-tightness between tire bead portions and the rims at the time of injecting compressed gas into the tire, the PCI main body can have a simple structure.

(3') Because a spacer can be inserted between a rim holder and a main body frame, a stroke of a rim interval adjusting screw can be comparatively small.

(4') Because the rim interval adjusting screw is located within the main body frame, it is difficult for lamp black to penetrate and adhere thereto.

(5') Because a vulcanized tire suspended from an unloader associated with a vulcanizing machine may be directly delivered onto one of the rims (the outside rim) carried by a loader associated with the PCI, the misclamping of the tire in the PCI caused by eccentricity between the tire and a rim can be prevented.

In addition, even in the case of a tire which does not have to be gripped, inflated and cooled by the PCI, a bypass of the PCI by that tire can be facilitated by the PCI without the need for a long vertical stroke of the unloader.

BRIEF DESCRIPTION OF THE DRAWINGS

The above-mentioned and other objects, features and advantages of the present invention will become more apparent by referring to the following description of preferred embodiments of the invention taken in conjunction with the accompanying drawings, wherein.

DETAILED DESCRIPTION OF THE PREFERRED EMBODIMENTS

At first, a first preferred embodiment of the present invention will be described with reference to FIGS. 1 to 4.

Figure 3:
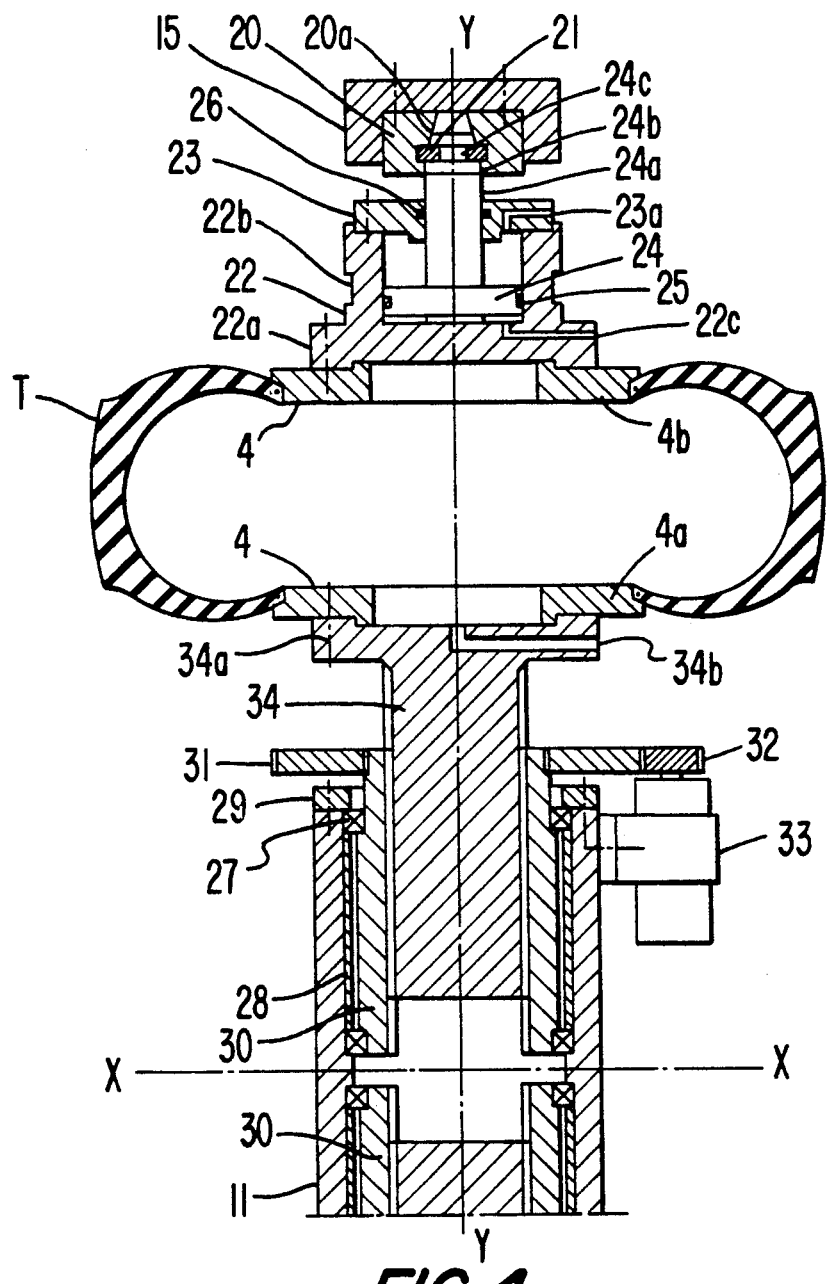
FIG. 3 is a cross-sectional view taken along line I—I in FIG. 1.
Figure 4:
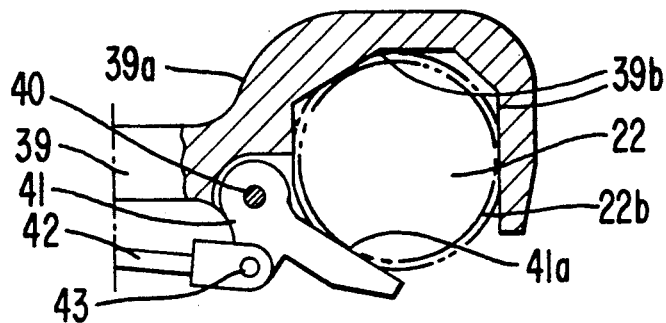
FIG. 4 is a cross-sectional view taken along line II—II in FIG. 1.

The illustrated PCI generally comprises a PCI main body 1 containing two sets of gripping mechanisms 2, a common frame 3, two pairs of rims 4, a loader 5, an ejection conveyor 6, and a control unit (not shown) for controlling these items. It is to be noted that reference character T designates a vulcanized tire, and reference numeral 7 designates an unloader associated with a vulcanizing machine (not shown). A main body frame 11 having axle portions 12 at its opposite ends is integrated with two beams 15 disposed symmetrically with respect to the main body frame 11 via side posts 14 disposed symmetrically at the same axle portions 12. The main body frame 11 is rotatably supported by the common frame 3 via bearings 13. A chain 17 is engaged with and stretched between a chain wheel 16 fixed to one of the above-mentioned axle portions 12 by well-known means and another chain wheel 18 fixed to an output shaft of a motor 19 fastened by bolts to the common frame 3 by well-known means. The main body frame 11 may be rotated and inverted by the action of the afore-mentioned motor 19. When line X—X in FIG. 3 is chosen as an X-axis and line Y—Y in FIG. 3 is chosen as a y-axis, the z-axis (coordinate axis in an orthogonal coordinate system) aligns with a rotary axis of the main body frame 11 in FIG. 1. A gear 31 is fixed by well-known means to one end of an outer shaft 30 which is rotatably supported by a plurality of bearings 27 having their outer rings fixed to the inside of the main body frame 11 by means of a spacer 28 and a retainer 29. A gear 32 is fixed by well-known means to an output shaft of a motor 33 fastened by bolts to the main body frame 11 and meshes with the above-described gear 31 so that the outer shaft 30 is rotated by the action of the aforementioned motor 33. An inside rim 4a is assembled, by well-known means such as bolts, to a flange 34a provided at one end of an inner shaft 34 having on its outer circumference male threads engaged with female threads formed on the inner circumference of the above-mentioned outer shaft 30. The flange 34a is provided with a gas communication hole 34b for feeding or exhausting compressed fluid to or from the inside of the tire T. One end of a rotary lock member 35 is fixed to the flange 34a. The other end of the same rotary lock member 35 is slidably inserted into a guide bush (not shown) which is assembled in the main body frame 11, so that as a result of rotation of the above-described outer shaft 30, the inner shaft 34 moves in the direction of line Y—Y jointly with the inside rim 4a.

On the other hand, a cap 23 is fastened by bolts to one end of a seal cylinder 22 having a flange 22a at the other end thereof. An outside rim 4b is assembled to the flange 22a by well-known means, and within the seal cylinder 22 are slidably assembled a piston 24 and a piston rod 24a. It is to be noted that reference numerals 25 and 26 designate well-known slide type seal packings.

A block 20 has a tapered hole 20a dimensioned to receive a tapered end 24b of the above-mentioned piston rod 24a. The block 20 is fixed to the beam 15 so that the outside rim 4b may be held concentric with the inside rim 4a. The piston rod 24a and the block 20 can be connected by a U-shaped key 21 assembled in block 20. The key 21 can be slid into slots 24c formed in the middle of the above-mentioned tapered surface 24b by a cylinder (not shown). The outside rim 4b is moved toward and away from the inside rim 4c in a concentric manner by feeding and exhausting pressurized fluid through passageways 22c and 23a formed in the flange 22a of the cylinder 22 and in the cap 23.

The loader 5 comprises rails 36 fixed to the common frame 3, linear bearings 37 slidable along the above-mentioned rails 36, a slide base 38 to which the aforementioned linear bearings 37 are fixed and which can be vertically moved by drive means (not shown), a loader arm 39 having one end pivotably supported by the above-mentioned slide base 38 so as to be swingable within a horizontal plane by means of a cylinder (not shown) and having at the other end a gripping finger 39a adapted to be engaged with the above-mentioned cylinder 22 within a groove 22b, and a second gripping finger 41 swingably mounted via a pin 40 in the proximity of the gripping finger 39a of the aforementioned loader arm 39 and adapted to be swung by means of a cylinder 42 connected thereto via a pin 43. The above-described cylinder 22 is gripped or released at three points by inside surfaces 39b and 41a of the gripping fingers 39 and 41 by the action of the cylinder 42.

The ejection conveyor 6 is a well-known roller conveyor having a plurality of freely rotatable rollers. The conveyor 6 is mounted to the common frame 3 with its upper surface inclined so that a tire T placed on that roll conveyor 6 may travel in the rear direction under gravity due to a component force of its own weight.

It is to be noted that in the illustrated embodiment, the flange 22a to which the outside rim 4b is mounted is integrated with the cylinder 22, and the piston rod 24a and the beam 15 are detachably connected so that the outside rim 4b can be carried in and carried out by the loader 5 via the cylinder 22. Alternatively, the cylinder could be fixed to the beam 15, and the flange to which the outside rim 4b is mounted and the piston rod could be detachably connected.

Now the operation of the first preferred embodiment will be described.

Figure 1:
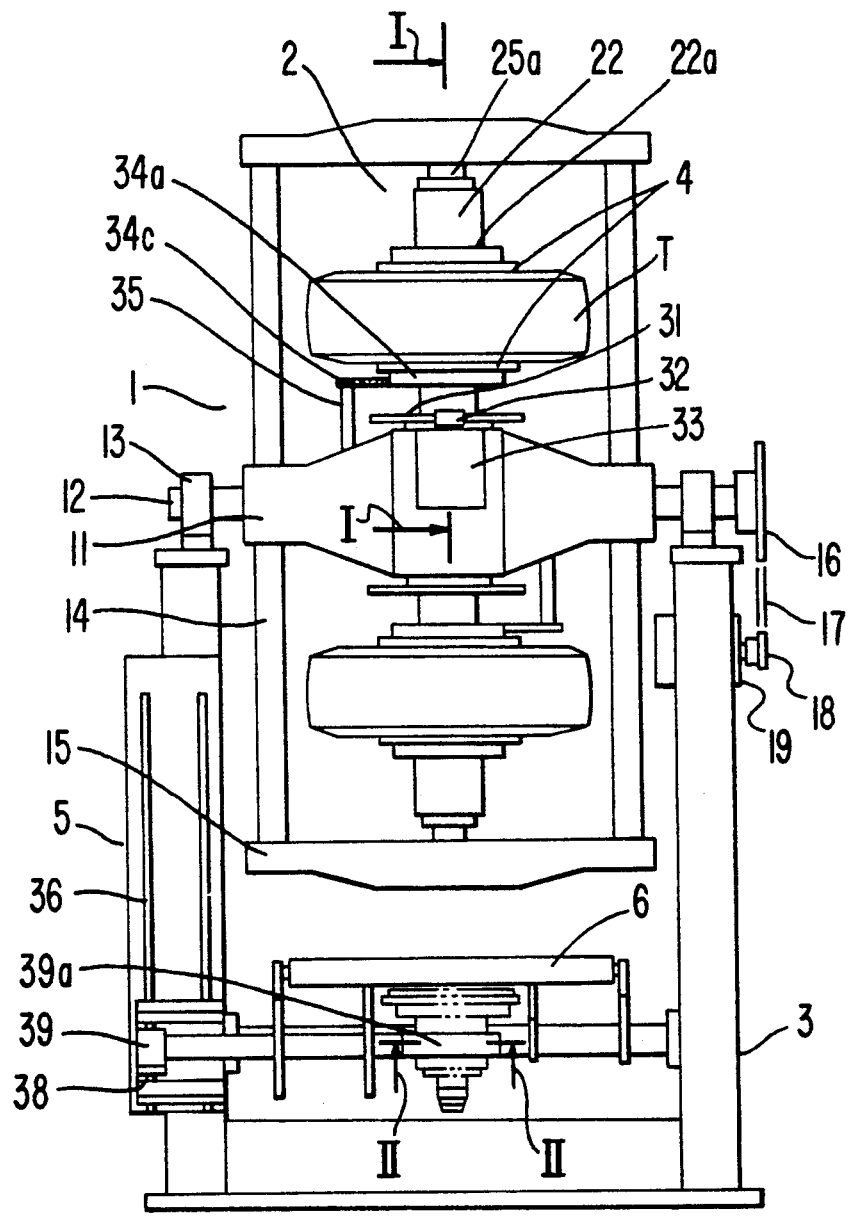
FIG. 1 is a front view of a first embodiment of an apparatus for gripping, inflating and cooling vulcanized tires according to the present invention.
Figure 2:
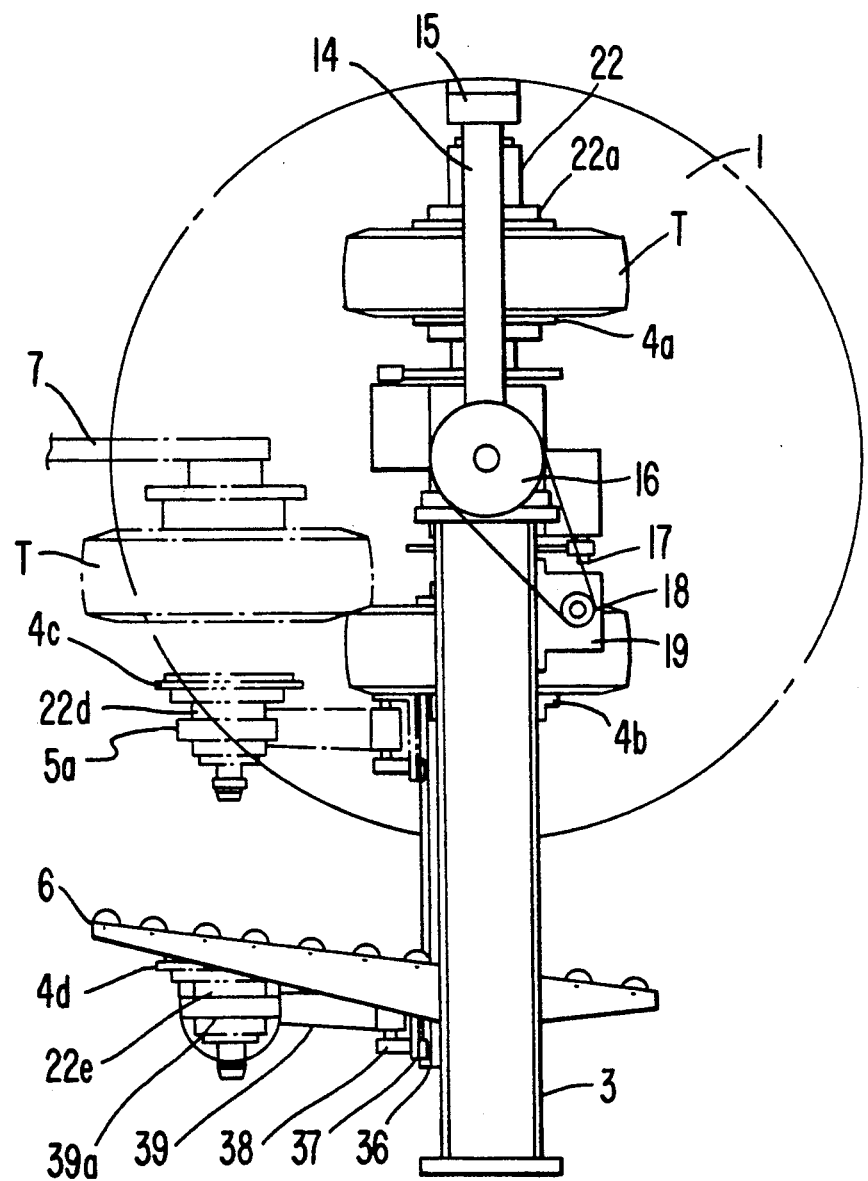
FIG. 2 is a side view of the same apparatus.

It is assumed that cooling of the tire on the lower side in FIGS. 1 and 2 has been finished. After the pressurized fluid in the tire T on the lower side has been exhausted, pressurized fluid is exhausted through the passageway 23a in the cap 23 while pressurized fluid is being fed through the passageway 22c in the cylinder 22. Also the outer shaft 30 is rotated to retract the inner shaft 34 by actuating the motor 33, thereby raising the tire T on the lower side towards the center of rotation of the main body frame 11 and separating the inside rim 4a from the tire T. Subsequently, after the loader arm 39 has been swung to insert the gripping fingers 39a and 41 within the groove 22b in the cylinder 22 and grip the cylinder 22, the U-shaped key is moved to an unlocking position. Then, the feeding and exhausting of the pressurized fluid through the passageways 22c and 23a are reversed to retract the piston rod 24a and disengage it from the beam 15, whereby the loader 5 supports the weight of the tire T, the outside rim 4b and the cylinder 22. Next, when the loader arm 39 is rotated horizontally, the outside rim 4b having the tire T placed thereon is carried to the outside of the PCI main body 1, and after completion of the rotation, when the outside rim 4b is lowered until it is positioned under the roller plane of the ejection conveyor 6 (the position 4d in FIG. 2), the tire remains on the roller plane, moves on the ejection conveyor 6 due to a component force of its own weight, and is ejected to the outside of the PCI.

After ejection of the tire, the loader is raised (the outside rim is held gripped at the position 4c in FIG. 2) to wait for a tire to be next subjected to a cooling treatment. Here, a vulcanized but uncooled tire T is suspended from a vulcanization metal mold by means of a well-known unloader 7 associated with a vulcanizing machine and concentrically placed on the above-mentioned outside rim 4c. After the unloader 7 has returned to a standby position, the loader arm 39 is horizontally rotated so that the above-mentioned tire T is carried into the PCI main body 1 jointly with the outside rim. It is to be noted that in the case of vulcanizing a tire which does not require a cooling treatment, it is only necessary to keep the loader arm 39 under the roller plane of the ejection conveyor 6 and to release the tire suspended by the unloader on the same roller plane.

When the tire T placed on the outside rim has been carried into the PCI main body and has been aligned with the line Y—Y in FIG. 2, the feeding and exhausting of pressurized fluid through the passageways 22c and 23a are reversed to extend the piston rod 24a and engage it with the block 20 within tapered hole 20a. Then the U-shaped key 21 is moved to a locking position. Also, the inside rim 4a and the bead portion of the tire T are engaged with each other by rotating the outer shaft 30 by means of the motor 33 to extend the inner shaft 34. After the inside rim 4a has been moved more than enough to ensure gas-tightness between the bead portion of the tire and the rim, the motion is automatically stopped. Thereafter, the gripping finger 41 of the loader 5 is released and the loader arm 39 is horizontally rotated from the standby position. Then pressurized fluid is injected into the tire through passageway 34b, and the inflating and cooling step is initiated. The stop position of the above-mentioned motor 33 is preset in such manner that as the inner pressure of the tire rises, the cylinder 22 is pushed back via the outside rim 4b, and when it has stopped as butting against the piston 24, a predetermined bead interval of the same tire T is established.

When a predetermined period of time has elapsed from the start of the inflating and cooling step, the motor 19 is started and the PCI main body 1 is inverted by 180 degrees. This inverting operation could be repeated a plurality of times during the inflating and cooling step, or could be carried out in increments of 90 degrees, respectively.

Now a second preferred embodiment of the present invention will be described with reference to FIGS. 5 to 8.

The illustrated PCI generally comprises a PCI main body 10 containing two sets of gripping mechanisms 102, a common frame 103, two pairs of rims 104, a loader 105, an ejection conveyor 106, and a control unit (not shown) for controlling these items. It is to be noted that reference character T designates a vulcanized tire, character Ta designates a vulcanized tire to be processed next, and reference numeral 107 designates an unloader associated with a vulcanizing machine (not shown).

A main body frame 111 having axle portions 112 at its opposite ends is integrated with two beams 115 disposed symmetrically with respect to the main body frame 111 via side posts 114 disposed symmetrically at the same axle portions 112. The main body frame 111 is rotatably supported by the common frame 103 via bearings 113. A chain 117 is engaged with and stretched between a chain wheel 116 fixed to one of the above-mentioned axle portions 112 by well-known means and another chain wheel 118 fixed to an output shaft of an inverting motor 119 fastened by bolts to the common frame 103. The main body frame 111 may be rotated and inverted by the action of the aforementioned motor 119.

Figure 5:
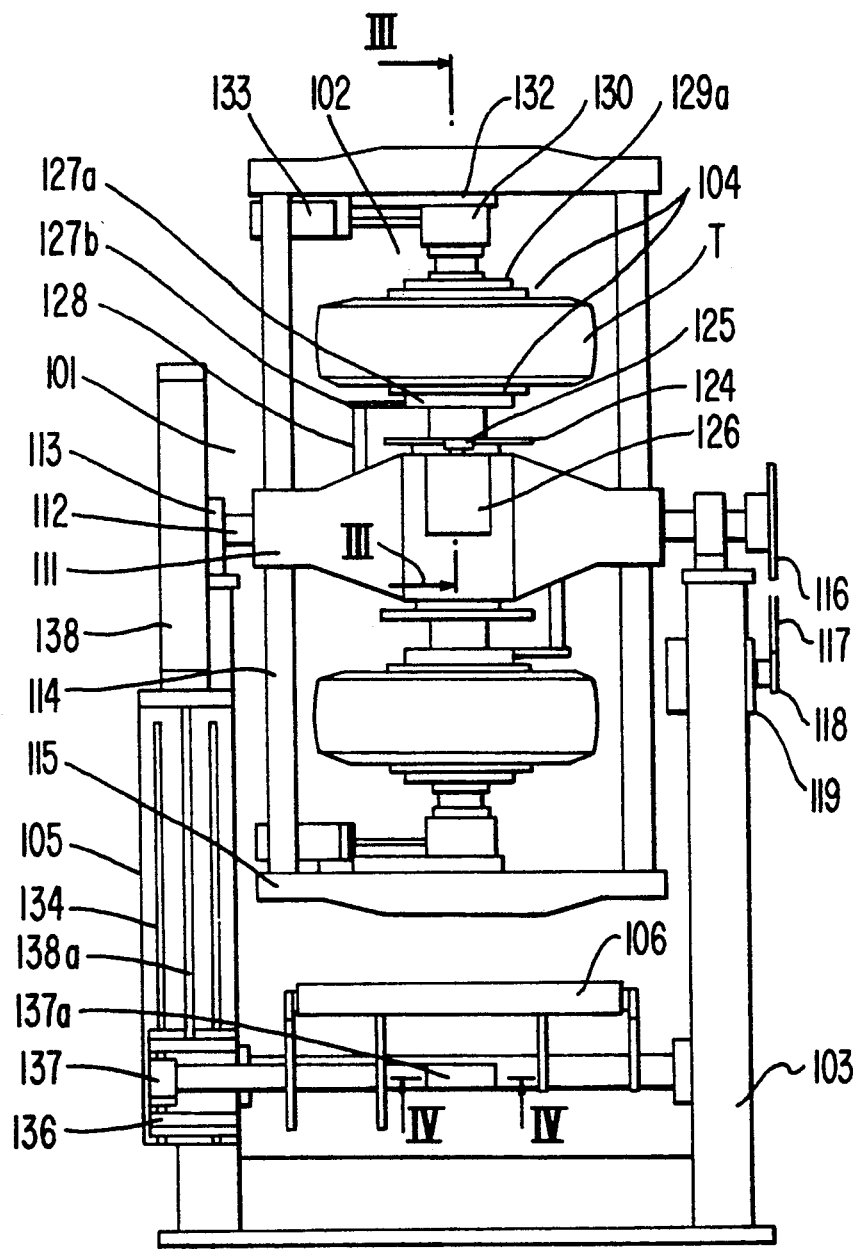
FIG. 5 is a front view of a second embodiment of an apparatus for gripping, inflating and cooling vulcanized tires according to the present invention.
Figure 7:
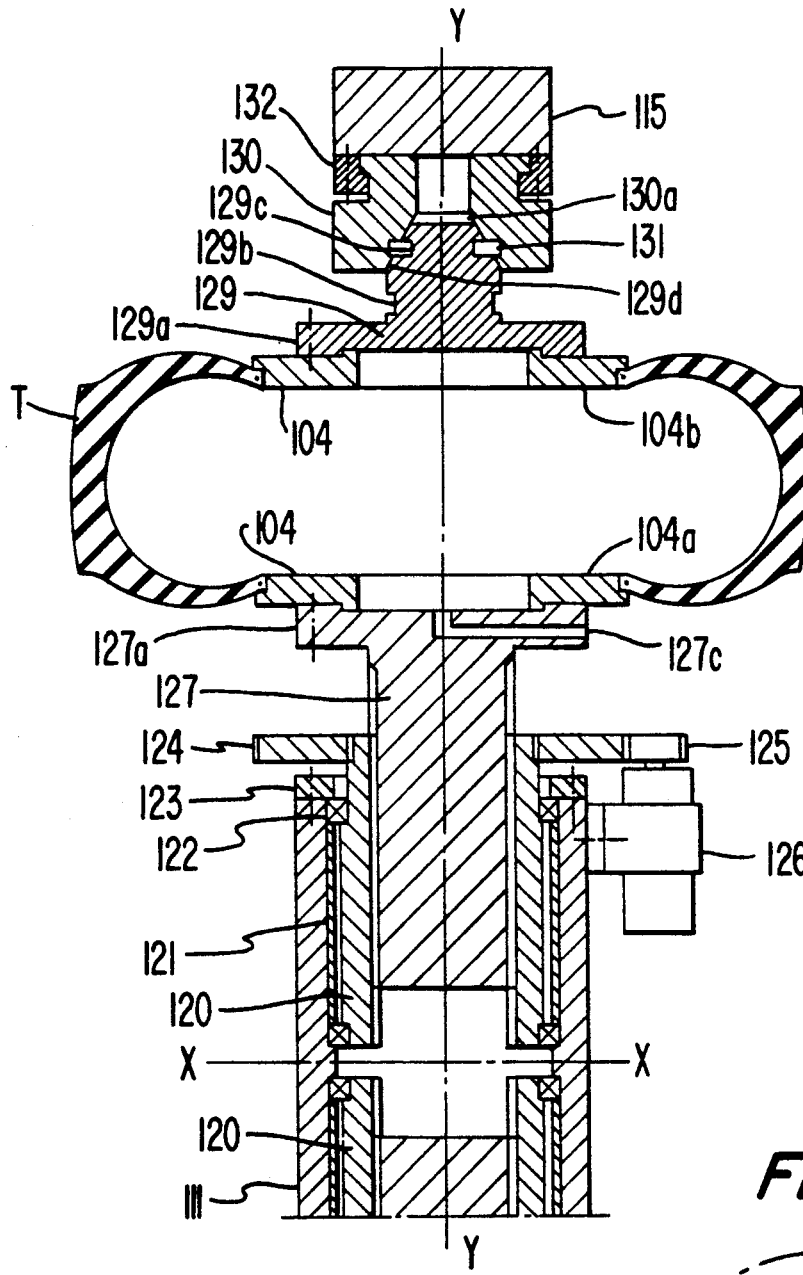
FIG. 7 is a cross-sectional view taken along line III—III in FIG. 5.
Figure 8:
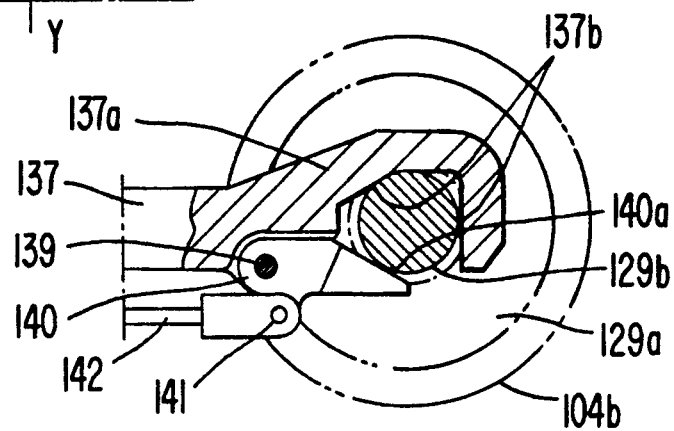
FIG. 8 is a cross-sectional view taken along line IV—IV in FIG. 5.

When line X—X in FIG. 7 is chosen as an x-axis and line Y—Y in FIG. 7 is chosen as a y-axis, the z-axis (coordinate axis in an orthogonal coordinate system) aligns with a rotary axis of the main body frame 111 in FIG. 5. A gear 124 is fixed by well-known means to one end of an outer shaft 120 which is rotatably supported by a plurality of bearings 122 having their outer rings fixed to the inside of the main body frame 111 by means of a spacer 121 and a retainer 123. A gear 125 is fixed by well-known means to an output shaft of a motor 126 fastened by bolts to the main body frame 111 and meshes with the above-described gear 124. An inside rim 104a is fastened by bolts to a flange 127a provided at one end of an inner shaft 127 having male threads engaged with female threads formed on the inner circumference of the above-mentioned outer shaft 120. The flange 127a is provided with a gas communication hole 127c for feeding or exhausting compressed fluid to or from the inside of the tire T. One end of a rotary lock member 128 is fixed to one end of an arm 127b the other end of which is fixed to the flange 127a. The other end of the same rotary lock member 128 is slidably inserted into a guide bush (not shown) which is assembled to the main body frame 111, so that if the outer shaft 120 is rotated by the action of the above-described motor 126, the inside rim 104a is moved in the direction of line Y—Y.

On the other hand, a rim holder 129 having at one end a flange 129a for supporting the outside rim 104b is provided at its middle portion with a groove 129b to receive gripping fingers 137a and 140 of a loader 106 which will be described later. The other end of the rim holder 129 defines inclined surfaces 129d. A U-shaped key 131 which is moved in and out by a cylinder (not shown) is assembled in a slide block 130 having inclined surfaces 130a adapted to be engaged with the above-mentioned inclined surfaces 129d. A groove 129c is adapted to receive the above-mentioned U-shaped key 131 when the U-shaped key 131 is in a moved-in condition. The groove 129c is formed in the proximity of the central portion of the tapered surfaces 129d of the above-described rim holder 129. By moving the aforementioned U-shaped key 131 in or out, the rim holder 129 is locked to or released from the slide block 130. The above-mentioned slide block 130 is slidably mounted to the beam 115 of the main body frame 111 via guides 132 such that the slide block 130 can be moved by a cylinder 133 from the position where the respective rims 104a and 104b are concentric to the position where the slide block 130 does not interfere with the carrying-in and carrying-out of the rim holder 129 by the above-mentioned loader 105. The cylinder 133 is connected to the above-mentioned slide block 130 and the aforementioned beam 115.

The loader 105 comprises a wide base 136, to which are fixed linear bearings 135 that are slidable along rails 134 fixed to the common frame 103, and to which is connected a rod 138a of a cylinder 138 fixed to the common frame 103, a loader arm 137 having one end pivotally supported by the above-mentioned slide base 136 so as to be rotatable within a horizontal plane by a cylinder (not shown) and having at the other end a gripping finger 137a that is engageable with the aforementioned rim holder 129 within groove 129b, and a second gripping finger 140 swingably mounted via a pin 139 at the proximity of the base of the above-mentioned gripping finger 137a to be likewise received within the same groove 129b. The loader 105 grips or releases the rim holder 129 at three points 137b and 140a at the bottom of groove 129b by the action of a cylinder 142 connected to the gripping finger 140 via a pin 141.

The ejection conveyor 106 is a well-known roller conveyor having a plurality of freely rotatable rollers. The conveyor 106 is mounted to the common frame 103 with the upper surface of the row of rollers inclined so that a tire T placed on the roller conveyor 108 can travel in the rear direction under gravity due to a component force of its own weight.

It is to be noted that although the cylinder block 130 having a U-shaped key 131 assembled therein is movable by the cylinder 133 in the illustrated embodiment, the above-described slide block 130 can be fixed. In this case, the stroke of the inner shaft 127 is made sufficient to allow the inner shaft 127 to be located at a position where the inside rim 104a will not interfere with the carrying in or out the tire. The inner shaft 127 is then moved so that a predetermined interval is set between the respective rims. Then the loader arm 137 is swung out and compressed gas is injected into the aforementioned tire T.

Next, the operation of the above-described preferred embodiment will be described.

Figure 6:
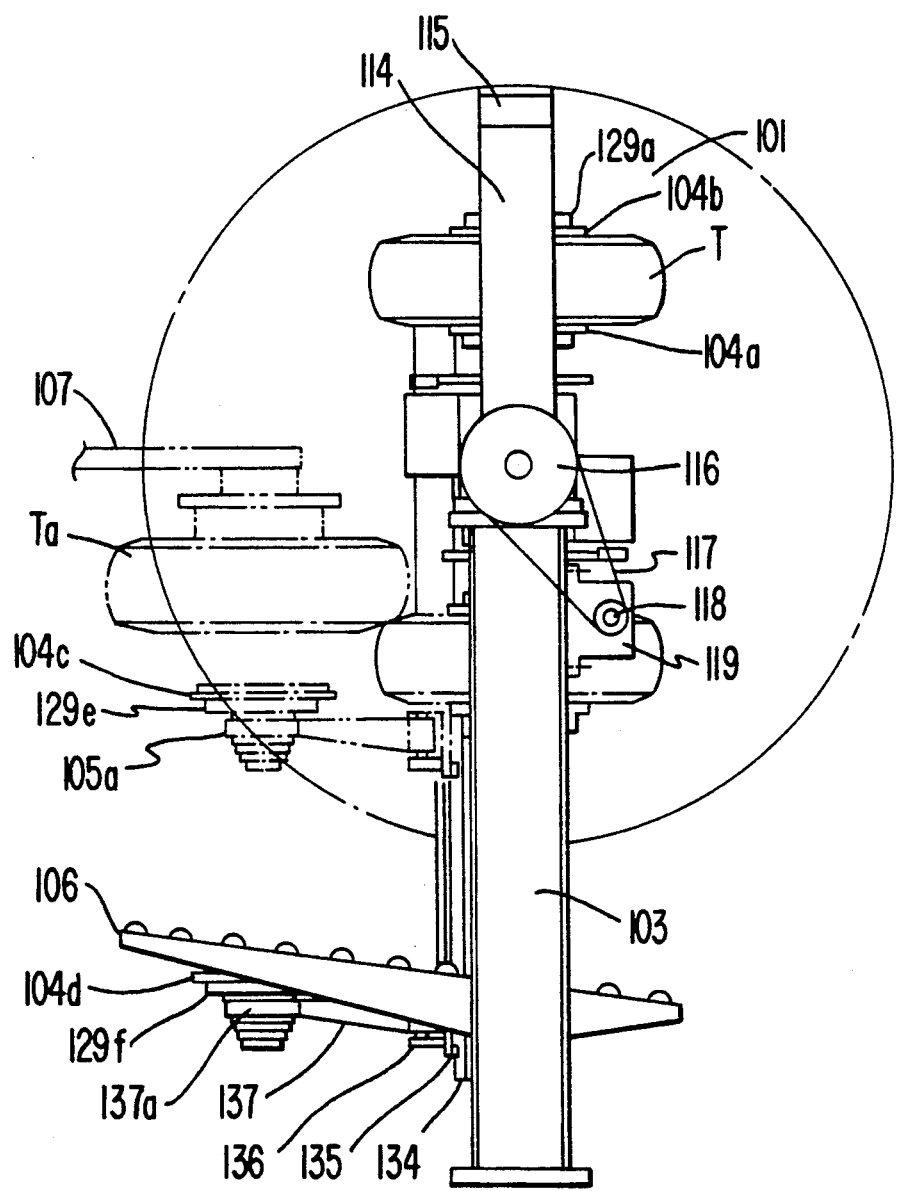
FIG. 6 is a side view of the same apparatus.

It is assumed that cooling of the tire on the lower side in FIGS. 5 and 6 has been finished. The loader arm 137 is rotated to make it grip the rim holder 129 by means of the gripping fingers 137a and 140. Then after the rim holder 129 has been unlocked by moving the U-shaped key 131, the loader arm 137 is raised while the compressed gas within the above-mentioned tire T is being exhausted. When the above-mentioned rim holder 129 has been disengaged from the slide block 130, the same slide block 130 is moved by the cylinder 133.

When the movement of the slide block 130 have finished, the loader arm 137 is moved in the opposite direction (i.e., lowered) to the position where a tire does not interfere with the inside rim 104a when the tire is carried in or out of the PCI. After the above-mentioned tire T has been lowered, the loader arm 137 is rotated to carry the tire T placed on the outside rim 104b to the outside of the PCI main body jointly with the outside rim 104b via the rim holder 129.

Thereafter, when the outside rim 104b is lowered under the roller plane of the ejection conveyor 106 as shown at 104d in FIG. 6 by again lowering the loader arm 137, the tire T placed on the rim 104b remains on the roller plane of the ejection conveyor 106, then moves on the ejection conveyor 106 in the rear direction due to a component force of its own weight, and is ejected to the outside of the PCI. When the ejection of the tire has finished, the loader arm 137 is raised and brought into the state shown at 105a in FIG. 6 for the purpose of receiving a tire to be processed next, and the outside rim 104c stands by at the position indicated by numeral 104c.

A vulcanized but uncooled tire Ta to be processed next, which is suspended from the unloader 107, is directly placed on the outside rim 104b held at the position indicated by reference numeral 104c. When the above-mentioned tire Ta has been delivered, the loader arm 137 is rotated to carry the tire Ta jointly with the outside rim into the PCI main body 101. In the case where the above-mentioned tire Ta does not require gripping, inflating and cooling, when the delivery of the tire Ta has finished, if the loader arm is lowered, then the tire Ta can be ejected in the rear direction of the PCI via the ejection conveyor 106 in the above-described manner, and the tire can be made to bypass the PCI main body 101.

When the outside rim 104b has come to the concentric position with respect to the inside rim 104a and the rotation of the loader arm 137 has finished, the loader arm 137 is raised by the cylinder 138 and after the tire Ta placed on the outside rim 104b via the outside rim 104b, the slide block 130 is moved to center the inclined surfaces 130a of the slide block 130 with respect to the outside rim 104b. Thereafter, if compressed gas is injected into the tire Ta, the tire Ta is inflated. Hence, the loader arm 137 is pushed back, and the inclined surfaces 129d of the rim holder 129 are engaged with the inclined surfaces 130a of the slide block 130. After the engagement between the respective inclined surfaces 129a and 130a has been completed, the U-shaped key 131 is moved to lock the slide block 130. At the same time the gripping finger 140 is released. After the loader arm 137 has been moved to the position where it does not interfere with rotation and inversion of the PCI main body 101, when a predetermined period of time has elapsed, the motor 119 is started and the PCI main body 101 is inverted by 180 degrees. This inversion could be repeated a plurality of times during the inflating and cooling period, or it could be carried out in increments of 90 degrees each. It is to be noted that the outer shaft 120 is rotated, if necessary, to prevent a seizing of the screw threads.

As will be obvious from the detailed description of the preferred embodiment of the present invention above, the present invention offers the following advantages.

That is, according to the first aspect of the present invention, a PCI main body includes two sets of gripping mechanisms and is rotatable about a horizontal axis, and a loader for detachably gripping an outside rim is swingable in a horizontal plane. A tire fed from an unloader associated with a vulcanizing machine is received on the outside rim gripped by the loader externally of the PCI main body, the loader is rotated to a position underneath the PCI main body, the tire and the outside rim are locked to the main body, after the tire has been seated on an compressed fluid is fed to the inside of the tire, and the PCI main body is rotated. Accordingly, the following advantages are obtained.

No guide mechanism is necessary for moving the outside rim in the direction of line Y—Y, which guide mechanism detracted from the preciseness in establishing concentricity between the respective rims in the PCI in the prior art. Accordingly, the present invention offers great improvement in uniformity of the cured tires. Also, a rim interval adjusting screw is disposed within a PCI main body frame remote from a tire which is a source of lamp black. Therefore, the adhesion of lamp black to the adjusting screw is inhibited. Furthermore, since the above-mentioned adjusting screw is rotated upon every mounting and dismounting operation of the tire, the seizure of the screw caused by the adhesion of lamp black thereto is also inhibited.

In addition, the rim interval adjustment operation, which is dangerous to carry out at a location where poor footing exists in the prior art, is carried out under a remote operation executed at an operation panel. Also, rims can be exchanged by causing the loader to carry the rim to the outside of the PCI main body. Hence, an auxiliary instrument such as a chain block or the like can be used, and the exchange of rims can be carried out easily in a short period of time. Furthermore, owing to the fact that a rim pressing mechanism is provided in association with the outside rim, the space necessary for allowing rotation of the PCI main body can be minimal.

According to the second aspect of the present invention, a main body of a PCI includes two sets of gripping mechanisms and is rotatable about a horizontal axis, a loader for detachably gripping an outside rim is swingable in a horizontal plane, and a slide mechanism causes a support member for the outside rim to retreat upon rotation of the above-described loader. A tire fed from an unloader associated with a vulcanizing machine is received on the outside rim of the loader externally of the PCI main body, the loader is rotated to a position underneath the PCI main body, the tire and the outside rim are locked to the support member, after the tire has been seated on the inside rim and the outside rim compressed fluid is fed to the inside of the tire, and the PCI main body is rotated. Accordingly, the following advantages are obtained.

As a result of the fact that one of the rims is carried to the outside of the PCI main body jointly with the tire, it is not necessary to provide a guide mechanism for moving the outside rim mounting frame which detracted from the preciseness in the concentricity between the respective rims in the PC in the prior art. Therefore, the present invention can offer an improvement in tire uniformity over the prior art. Also, by having the loader perform a tire pressing function, no tire pressing mechanism in the PCI main body is required, whereby space is saved for allowing the PCI main body to be inverted.

Furthermore, the specifics of the slide mechanism allows the stroke of the rim interval adjusting screw to remain short, and saves space necessary for allowing the PCI main body to be inverted.

In addition, in the prior art the seizure of threads occurred frequently, it was necessary to provide and store a large variety of spacers, and a rim interval adjusting operation was dangerous because it had to be carried out where there was poor footing. On the other hand, because the rim interval adjusting screw of the present invention is disposed within the PCI main body remote from the tire which is the source of lamp black, seizure of the threads can be prevented, and an operation can be carried out remotely at an operation panel. Also, when exchanging the rims, the rim is carried to the outside of the PCI main body by the loader. Hence, an auxiliary instrument such as hanging tools can be easily used, and the exchange of rims can be carried out easily in a short period of time.

While a principle of the present invention has been descried above in connection with preferred embodiments of the invention, it is intended that all matter contained in the above description and illustrated in the accompanying drawings be interpreted as illustrative and not as a limitation on the scope of the invention.

What is claimed is:

1. Apparatus for gripping, inflating and cooling vulcanized tires, said apparatus comprising:

a common frame, and a main body rotatably supported on said common frame about a horizontal axis, said main body including a main body frame situated along said horizontal axis, and two beams disposed symmetrically with respect to said horizontal axis on opposite sides of said main body frame from one another, said two beams being integral with said main body frame;

two outside rims, and locking mechanisms detachably mounting said outside rims to said beams, respectively, said locking mechanisms being operatable to selectively lock said outside rims to said beams and to unlock the outside rims from said beams, respectively;

two inside rims movably mounted to said main body frame and disposed on opposite sides of said main body frame one another at locations across from said outer rims, respectively, and driving devices operatively connected to said inside rims so as to move said inside rims relative to said main body frame toward and away from said outside rims in directions perpendicular to said horizontal axis, and each of said inside rims defining a fluid passageway therein such that compressed fluid can be introduced into and exhausted from the interior of a tire gripped between a respective pair of said inside and outside rims; and a loader including a loader arm, and a gripper disposed at an end of said loader arm and configurated to support each of said outside rims, said loader arm being supported for vertical movement in the apparatus between a first vertical position at which said loader arm is located at a level below said main body frame and a second position, and said loading arm being supported in the apparatus so as to be pivotable relative to said common frame in a horizontal plane, such that said loader arm is swingable to a first rotational position at which said gripper is located directly beneath said main body frame and to a second rotational position at which the gripper is spaced from a vertical plane passing through said horizontal axis so as to be located to the outside of said main body.

2. Apparatus for gripping, inflating and cooling vulcanized tires as claimed in claim 1, wherein said locking mechanisms each include a key mounted in the apparatus so as to be slidable in opposite directions parallel to said horizontal axis.

3. Apparatus for gripping, inflating and cooling vulcanized tires as claimed in claim 1, wherein said outside rims have a support integral therewith, said support having a groove therein, and said gripper has fingers capable of engaging said support within the groove thereof.

4. A post-cure inflation method for vulcanized tires, said method comprising:

detaching an outside rim from a rotatable main body of a post-cure inflating apparatus having two pairs of inside and outside rims, the outside rims of said pairs being detachably mounted to the main body;

moving the detached outside rim to a position spaced from a vertical plane passing through a rotational axis of the main body so as to be disposed at a location outside of the apparatus with respect to the main body while gripping the outside rim;

seating a tire, fed from a vulcanizing machine, on the gripped outside rim located at said position outside the apparatus;

moving the gripped outside rim and the tire loaded thereon directly underneath the main body of the post-cure inflating apparatus;

subsequently locking the outside rim to the main body across from an inside rim mounted to the main body with the tire interposed between the inside and the outside rims, and seating the tire on the inside rim; and subsequently feeding fluid under pressure into the tire as seated on the inside and the outside rims, and rotating the main body about said axis of rotation.

5. A post-cure inflation method for vulcanized tires as claimed in claim 4, wherein the seating of the tire on the inside rim is accomplished by moving and guiding the inside rim under power toward the outside rim.

6. A post-cure inflation method for vulcanized tires as claimed in claim 4, wherein the locking of the outside rim to the main body is carried out by moving a locking key in a direction parallel to the rotational axis of the main body.

7. A post-cure inflation method for vulcanized tires as claimed in claim 4, wherein the moving of the detached outside rim and the moving of the gripped outside rim are carried out by swinging the outside rim in a horizontal plane.

8. Apparatus for gripping, inflating and cooling vulcanized tires, said apparatus comprising:
   a common frame, and a main body rotatably supported on said common frame about a horizontal axis,
   said main body including a main body frame situated along said horizontal axis, and two beams disposed symmetrically with respect to said horizontal axis on opposite sides of said main body frame from one another, said two beams being integral with said main body frame;
   slide blocks mounted to said beams, respectively, slidable along said beams, and fixable in position on said beams;
   two outside rims, the locking mechanism detachably mounting said outside rims to said slide blocks, respectively said locking mechanisms being operable to selectively lock the outside rims to said slide blocks and to unlock the outside rims from said slide blocks, respectively;
   two inside rims movably mounted to said main body frame and disposed on opposite sides of said main body frame from one another at locations across from said outside rims, respectively, and driving devices operatively connected to said inside rims so as to move said inside rims relative to said main body frame toward and away from outside rims in directions perpendicular to said horizontal axis, and each of said inside rims defining a fluid passageway therein such that compressed fluid can be introduced into and exhausted from the interior of a tire gripped between a respective pair of said inside and outside rims; and
   said loader arm being supported for vertical movement in the apparatus between a first vertical position at which said loader arm is located at a level below said main body frame and a second position, and said loading arm being supported in the apparatus so as to be pivotable relative to said common frame in a horizontal plane, such that said loader arm is swingable to a first rotational position at which said gripper is located directly beneath said main body frame and to a second rotational position at which the gripper is spaced from a vertical plane passing through said horizontal axis so as to be located to the outside of said main body.

9. Apparatus for gripping, inflating and cooling vulcanized tires as claimed in claim 8, wherein said locking mechanisms each include a key mounted in the apparatus so as to be slidable in opposite directions parallel to said horizontal axis.

10. Apparatus for gripping, inflating and cooling vulcanized tires as claimed in claim 8, wherein said outside rims have a support integral therewith, said support having a groove therein, and said gripper has fingers capable of engaging said support within the groove thereof.

11. A post-cure inflation method for vulcanized tires, said method comprising:
   detaching an outside rim from a rotatable main body of a post-cure inflating apparatus having two pairs of inside and outside rims, the outside rims of said pairs being detachably mounted to the main body;
   moving the detached outside rim to a position spaced from a vertical plane passing through a rotational axis of the main body so as to be disposed at a location outside of the apparatus with respect to the main body while gripping the outside rim;
   seating a tire, fed from a vulcanizing machine, on the gripped outside rim located at said position outside the apparatus;
   moving the gripped outside rim and the tire loaded thereon directly underneath the main body of the post-cure inflating apparatus;
   sliding a slide block along the main body to a position which will center the slide block with the gripped outside rim positioned underneath the main body of the post-cure inflating apparatus, and fixing the slide block at said position relative to the main body;
   once the slide block and the gripped outside rim are centered, locking the outside rim to said slide block across from an inside rim mounted to the main body with the tire interposed between the inside and the outside rims, and seating the tire on the inside rim; and
   subsequently feeding fluid under pressure into the tire as seated on the inside and the outside rims, and rotating the main body about said axis of rotation.

12. A post-cure inflation method for vulcanized tires as claimed in claim 11, wherein the locking of the outer rim to the slide block is carried out by moving a locking key in a direction parallel to said rotation axis.

13. A post-cure inflation method for vulcanized tires as claimed in claim 11, wherein the slide block is slid in a direction parallel to said rotational axis.

14. A post-cure inflation method for vulcanized tires as claimed in claim 11, wherein the slide block is slid in a direction parallel to the rotational axis about which the main body rotates.

15. A post-cure inflation method for vulcanized tires as claimed in claim 11, wherein the seating of the tire on the inside rim is carried out by moving and guiding the inside rim under power toward the outside rim.

16. A post-cure inflation method for vulcanized tires as claimed in claim 14, wherein the moving of the detached outside rim and the moving of the gripped outside rim are carried out by swinging the outside rim in a horizontal plane.

* * * * *